(12) United States Patent
Jack et al.

(10) Patent No.: US 6,360,417 B1
(45) Date of Patent: Mar. 26, 2002

(54) METHOD OF ASSEMBLING A REMOTE KEYLESS ENTRY TRANSMITTER

(75) Inventors: Robert A. Jack, Hartland; Thomas R. Tracz, Dearborn, both of MI (US); Mark Kane, Auburn, NY (US); Stephan Gierlach, Fowlerville, MI (US); Geoffrey Wright, Clarkston, MI (US); Kurt R. Odmark, Farmington Hills, MI (US)

(73) Assignee: TRW Inc., Lyndhurst, OH (US)

( * ) Notice: Subject to any disclaimer, the term of this patent is extended or adjusted under 35 U.S.C. 154(b) by 0 days.

(21) Appl. No.: 09/366,093

(22) Filed: Aug. 2, 1999

(51) Int. Cl.[7] .................................................. B23P 11/00
(52) U.S. Cl. ............................. 29/430; 29/464; 29/799; 29/DIG. 105
(58) Field of Search ....................... 29/430, 464, 281.1, 29/281.5, DIG. 105, 799

(56) References Cited

U.S. PATENT DOCUMENTS 4,361,822 A * 11/1982 Adler
4,369,563 A * 1/1983 Williamson

* cited by examiner

Primary Examiner—David P. Bryant
(74) Attorney, Agent, or Firm—Tarolli, Sundheim, Covell, Tummino & Szabo L.L.P.

(57) ABSTRACT

A method of assembling a remote keyless entry transmitter (10) having a housing and at least one battery in the housing includes the steps of providing a first housing part (70) and a battery (80, 82) to be assembled with the first housing part; positioning the battery in a desired location on the first housing part; and applying a magnetic field to the battery to maintain the battery in the desired location in the housing part during further assembly of the remote keyless entry transmitter.

4 Claims, 2 Drawing Sheets

METHOD OF ASSEMBLING A REMOTE KEYLESS ENTRY TRANSMITTER

BACKGROUND OF THE INVENTION

1. Technical Field

The present invention relates to a method of assembling a remote keyless entry (RKE) transmitter. In particular, the present invention relates to a method of maintaining the battery of an RKE transmitter in position in the housing during assembly of the transmitter.

2. Description of the Prior Art

A vehicle RKE system includes a transmitter and a receiver. The transmitter is a small device typically carried on a key ring. One type of transmitter includes a plastic housing made of first and second mating housing parts. Two batteries are enclosed in the housing. The transmitter is assembled on a conveyor line by laying the batteries loosely on the first housing part, moving the parts farther along the conveyor for more assembly steps, then placing the second housing part on top of the first. It can be difficult to maintain the batteries in position on the first housing part during the further assembly of the transmitter.

SUMMARY OF THE INVENTION

The present invention is a method of assembling a remote keyless entry transmitter having a housing and at least one battery in the housing. The method comprises the steps of providing a first housing part and a battery to be assembled with the first housing part; positioning the battery in a desired location on the first housing part; and applying a magnetic field to the battery to maintain the battery in the desired location in the housing part during further assembly of the remote keyless entry transmitter.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein.

DESCRIPTION OF A PREFERRED EMBODIMENT

Figure 1:
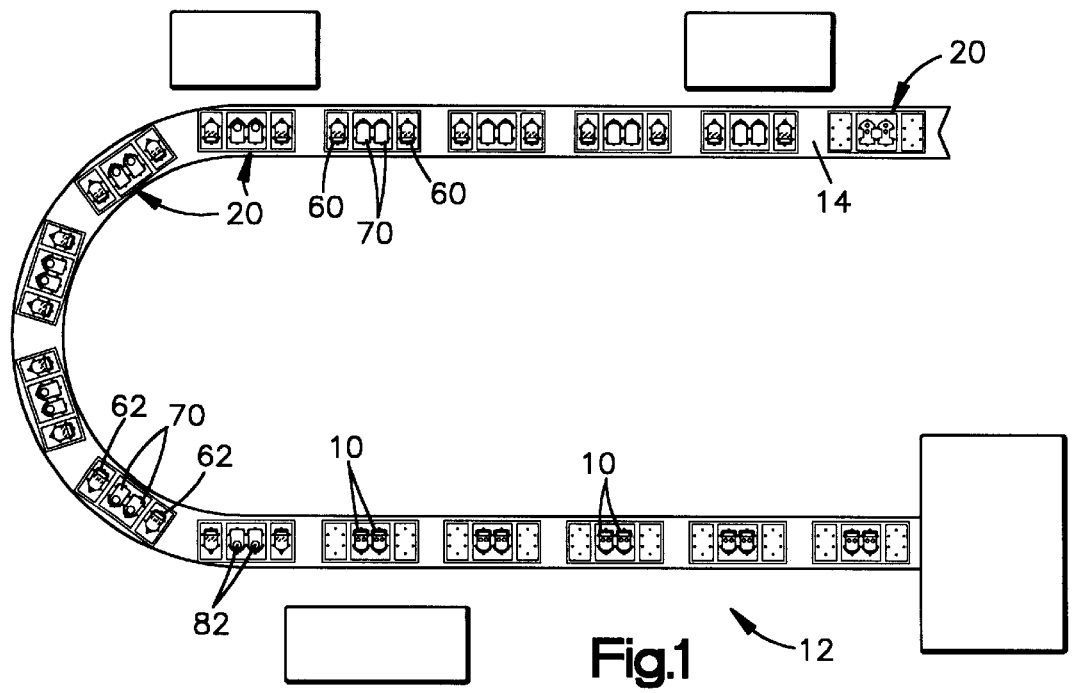
FIG. 1 is a schematic view of an assembly line in conjunction with which the assembly method of the invention is performed.
Figure 2:
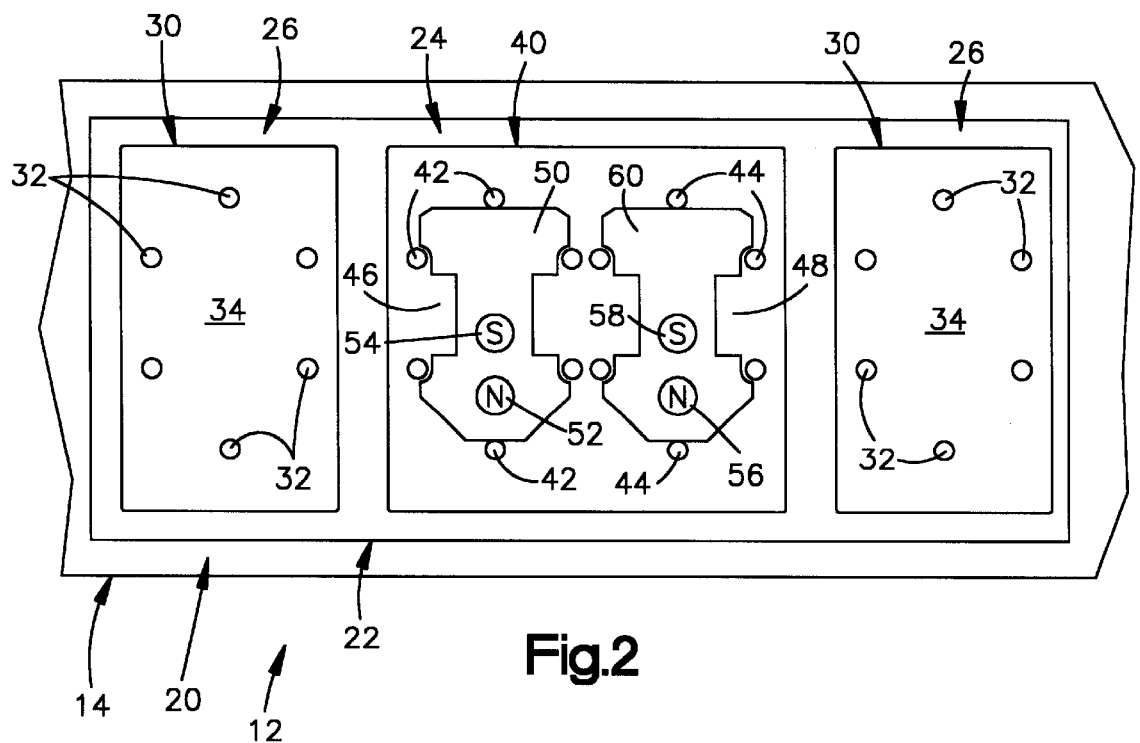
FIG. 2 is an enlarged view of a portion of the assembly line showing one assembly tray used in assembling two RKE transmitters.
Figure 5:
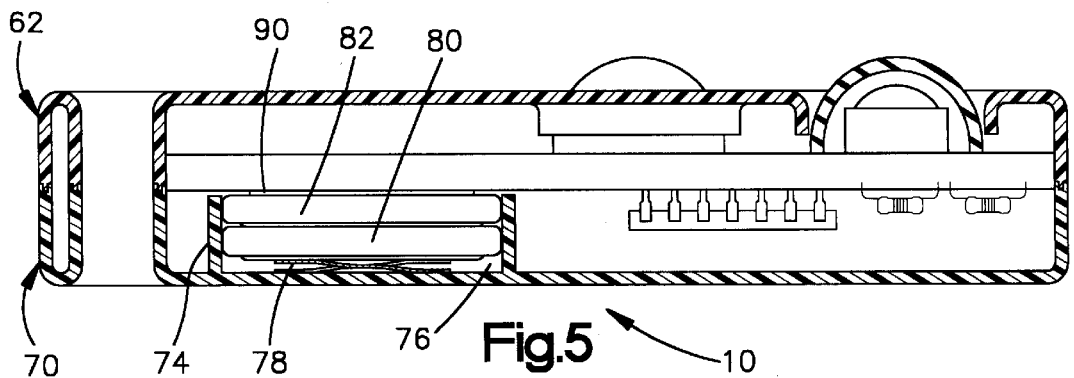
FIG. 5 is a sectional view of an assembled RKE transmitter.

The present invention relates to a method of assembling a remote keyless entry transmitter 10 (FIG. 5). The method is illustrated as being performed in conjunction with an assembly line 12 (FIG. 1). The assembly line 12 includes a conveyor belt 14.

A plurality of identical assembly trays 20 (FIGS. 1–4) are supported on the conveyor belt 14. Each assembly tray 20 is used in assembly of two RKE transmitters 10. Each one of the assembly trays 20 includes a base 22 that supports the other parts of the assembly tray. On each base 22 is one bottom support assembly 24 and two top support assemblies 26.

Each top support assembly 26 includes a top support platform 30 and a plurality of guide pins 32. The guide pins 32 project upward from the top support platform 30. The guide pins 32 are arranged in a pattern to define between them a receiving space 34 for receiving a top housing part 62 as described below.

The bottom support assembly 24 includes a bottom support platform 40 and two identical sets of guide pins 42 and 44. The guide pins 42 and 44 project upward from the bottom support platform 40. The guide pins 42 are arranged in a pattern to define between them a receiving space 46 for receiving a top housing part 62 as described below. The other guide pins 44 are arranged in a pattern to define between them a receiving space 48 for receiving another top housing part 62 as described below.

The bottom support assembly 24 also includes a pair of magnet holders 50 and 60 located in the receiving spaces 46 and 48, respectively. Each one of the magnet holders 50 and 60 is made from nylon. A pair of permanent magnets 52 and 54 are glued or otherwise secured in the magnet holder 50. A pair of permanent magnets 56 and 58 are glued or otherwise secured in the magnet holder 60.

Figure 3:
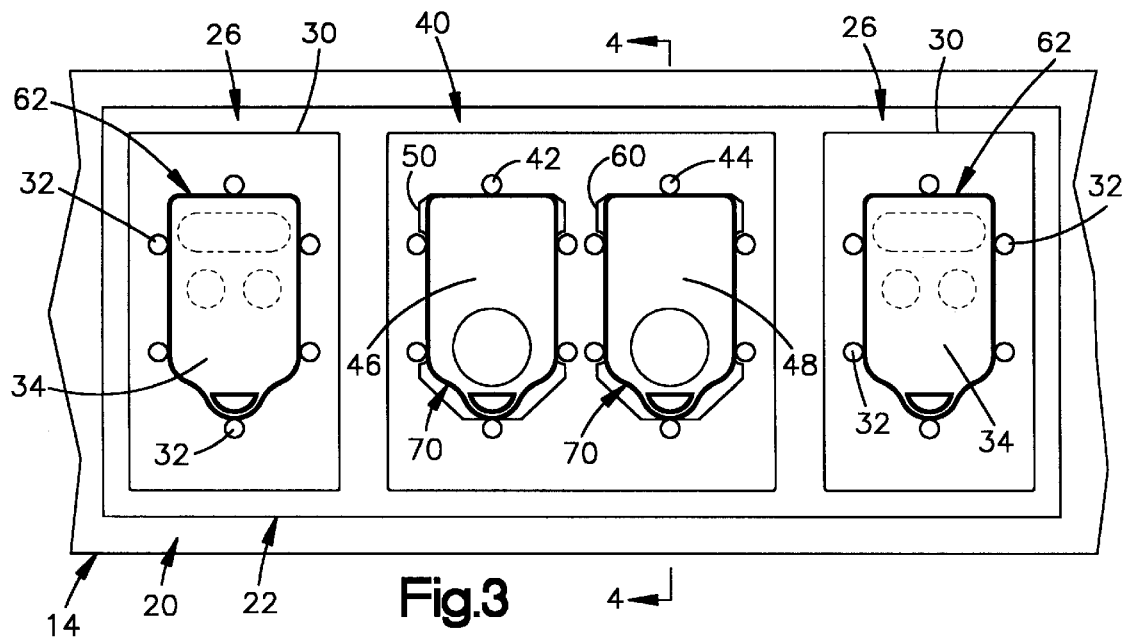
FIG. 3 is a view similar to FIG. 2 with housing parts of the two RKE transmitters in place.
Figure 4:
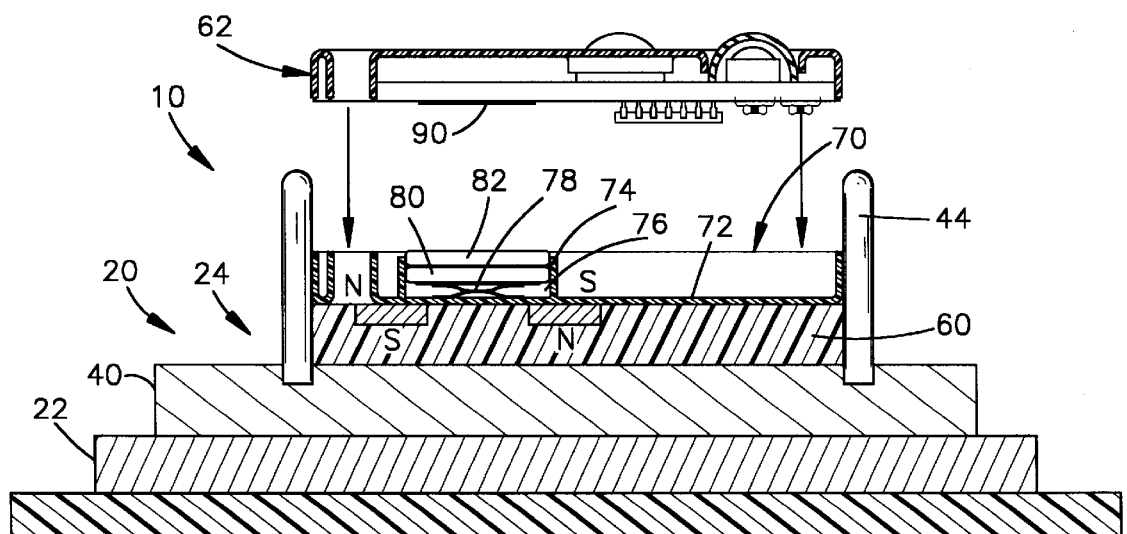
FIG. 4 is a sectional view taken along line 4—4 of FIG. 3.

The magnets 52–58 are polarized as shown in FIGS. 3 and 4. Specifically, the magnet 52 has a north pole facing up toward the receiving space, and a south pole facing down. The magnet 54 has a south pole facing up toward the receiving space, and a north pole facing down. The polarities of the magnets 56 and 58 on the magnet holder 60 are the same as those of the magnets 52 and 54 on the magnet holder 50.

During assembly of the RKE transmitter 10, a pair of top housing parts 62 (FIG. 3) are placed into the receiving spaces 34 in the top support assemblies 26. A pair of bottom housing parts 70 are placed into the receiving spaces 46 and 48 in the bottom support assembly 24. FIG. 4 is a detailed cross-sectional view illustrating assembly of one RKE transmitter 10 using the one set of guide pins 44 and the corresponding magnet holder 60.

The bottom housing part 70 of the RKE transmitter 10 has a generally flat bottom wall 72. A cylindrical wall 74 extends upward from the bottom wall. The cylindrical wall 74 defines a battery well 76 in the bottom housing part 70. A metal terminal spring 78 extends upward into the battery well.

After the bottom housing part 70 is placed on the bottom support assembly 24, a pair of batteries 80 and 82 are placed in the battery well 76. The batteries 80 and 82 are circular in shape and rest on the terminal spring 78. The length of the terminal spring 78 is such that about half the thickness of the upper battery 82 extends out of the battery well 76 above the end of the circular wall 74.

Each one of the batteries 80 and 82 is made of, or includes, a material that is magnetically attracted to a magnetic field (a "magnetic material"). Typically, each battery 80, 82 includes a case or shell made from a magnetic material such as steel.

The outer diameter of the batteries 80 and 82 is slightly less than the inner diameter of the battery well 76, to facilitate placement of the batteries into the battery well. This size difference allows the batteries 80 and 82 to move about some in the battery well 76. This range of movement can be a problem because the upper battery 82 might come out of the battery well 76 while the bottom housing part 70 is moved along the assembly line 12 for further assembly steps. It is important to keep the batteries 80 and 82 properly positioned in the battery well 76 during further assembly, especially during the subsequent step of placing the top housing part 62 on the bottom housing part 70 to complete the electric circuit through the batteries.

The magnets 56 and 58 are used to maintain the batteries 80 and 82 in position in the battery well 76. The magnets 56 and 58 are spaced apart on opposite sides of the battery well 76. The magnets 56 and 58 generate a magnetic field which extends through the battery well 76 and thus through the batteries 80 and 82. The force of the magnetic field holds the batteries 80 and 82 down on the terminal spring 78, compressing the spring slightly. The use of two magnets helps to center the batteries 80 and 82 in the battery well 76.

After the batteries 80 and 82 are placed on the terminal spring 78, the conveyor belt 14 moves the assembly tray 20 along the assembly line 12. The magnets 52–58 move with the batteries 80–82 and with the bottom housing parts 70. The magnets 52–58 continue to maintain the batteries 80 and 82 in position in the battery wells 76 of the bottom housing parts 70.

The other components of the transmitters 10 are then installed into the top and bottom housing parts 62 and 70. Thereafter, the top housing parts 62 are flipped over onto the bottom housing parts 70. A contact pad 90 on the top housing part 62 engages the upper battery 82. This engagement compresses the terminal spring 78 and presses the upper battery 82 fully into the battery well 76 in the bottom housing part 70. The magnets 52–58 continue to maintain the batteries 80 and 82 in position during this assembly step.

From the above description of the invention, those skilled in the art will perceive improvements, changes and modifications in the invention. For example, it is not necessary that permanent magnets be used to generate the magnetic field. Other devices, such as a fixed or moving electromagnet, could alternatively be used to generate the magnetic field. Such improvements, changes and modifications within the skill of the art are intended to be covered by the appended claims.

Having described the invention, we claim:

1. A method of assembling a remote keyless entry transmitter having a housing and at least two batteries in the housing, the method comprising the steps of:

providing a conveyor belt and placing assembly trays on said conveyor belt;

providing first and second magnets in a magnet holder and supporting said magnet holder on said assembly tray;

providing a first housing part and at least two batteries to be assembled with the first housing part and supporting said first housing part on said magnet holder, said magnet holder corresponding to the shape of the first housing part;

positioning a first battery in a desired location on the first housing part;

stacking a second battery on the first battery to form a stack of batteries in the desired location on the first housing part; and applying a magnetic field to the stack of batteries to maintain the stack of batteries in a stacked condition in the desired location on the first housing part during further assembly of the remote keyless entry transmitter;

said step of applying a magnetic field including the steps of locating said first and second magnets in said magnet holder to engage said first housing part underneath said first housing part at opposite edges of said first and second stacked batteries, and orienting said first and second magnets with different polarities facing toward the stack of batteries.

2. A method as set forth in claim 1 wherein said step of applying a magnetic field to the stack of batteries during further assembly of the remote keyless entry transmitter comprises the step of moving the first housing part and the stack of batteries along an assembly line after the stack of batteries are positioned on the first housing part.

3. A method as set forth in claim 1 wherein said moving step comprises moving said first and second magnets along the assembly line with the first housing part and said first and second batteries.

4. A method as set forth in claim 1 wherein said step of providing a first housing part and at least two batteries comprises the step of providing a first housing part having a battery well with an inner diameter larger than the outer diameter of each battery.

\* \* \* \* \*

UNITED STATES PATENT AND TRADEMARK OFFICE
CERTIFICATE OF CORRECTION

PATENT NO.    : 6,360,417 B1  Page 1 of 1
DATED         : March 26, 2002
INVENTOR(S)   : Robert A. Jack et al.

It is certified that error appears in the above-identified patent and that said Letters Patent is hereby corrected as shown below:

Column 4,
Line 35, after "claim", change "1" to -- 2 --.

Signed and Sealed this

Twenty-sixth Day of November, 2002

Attest:

Attesting Officer

JAMES E. ROGAN
Director of the United States Patent and Trademark Office